United States Patent [19]
von Hertling et al.

[11] Patent Number: 5,859,391
[45] Date of Patent: Jan. 12, 1999

[54] LOAD CELL

[75] Inventors: Felix von Hertling, Otzberg; Ralf Waegner, Trebur, both of Germany

[73] Assignee: Hottinger Baldwin Messetechnik GmbH, Darmstadt, Germany

[21] Appl. No.: 571,541

[22] Filed: Dec. 13, 1995

[30] Foreign Application Priority Data

Oct. 10, 1995 [EP] European Pat. Off. .............. 95115905

[51] Int. Cl.$^6$ ...................................................... G01G 1/00
[52] U.S. Cl. ...................................... 177/229; 73/862.634
[58] Field of Search ...................................... 177/211, 229; 73/862.629, 862.634, 862.636, 862.639, 862.633, 862.638

[56] References Cited

U.S. PATENT DOCUMENTS

| | | | |
|---|---|---|---|
| 2,986,931 | 6/1961 | Ormond | 73/862.634 |
| 4,009,608 | 3/1977 | Ormond | 177/229 |
| 4,459,863 | 7/1984 | Nordstrom | 73/862.66 |
| 4,836,036 | 6/1989 | Jetter | 177/211 X |
| 5,220,971 | 6/1993 | Farr | 177/229 |
| 5,259,253 | 11/1993 | Wirth et al. | 73/862.638 |
| 5,327,791 | 7/1994 | Walker | 73/862.628 |

FOREIGN PATENT DOCUMENTS

| | | |
|---|---|---|
| 0227850 | 6/1988 | European Pat. Off. . |
| 2809655 | 9/1979 | Germany . |
| 4313932 | 3/1994 | Germany . |
| 2128761 | 5/1984 | United Kingdom . |
| WO 92/13259 | 8/1992 | WIPO . |

*Primary Examiner*—Randy W. Gibson
*Attorney, Agent, or Firm*—W. F. Fasse; W. G. Fasse

[57] ABSTRACT

For producing load cells, especially for platform scales in which a beam that is clamped at one end in a bending stiff manner, is loaded at its opposite end, the measuring spring (1) is formed by a section (2) of a blank having a constant cross-section along its length. The section (2) is severed from the blank by parallel cuts so that the cut end surfaces (4) of the measuring spring (1) extend in parallel to each other and at a slant of an angle ($\alpha$) to the central plane (3). Hereby the expense for material is reduced.

8 Claims, 2 Drawing Sheets

LOAD CELL

The invention relates to a load cell, particularly for use in a scale with a top platform. The load cell comprises a measuring spring constructed as a bending beam or a multi-bending beam and serving as a force-strain transducer. The measuring spring is made of one material piece and is provided at its ends with holes for securing means such as screws. Strain gages for an electrical strain measurement are secured to the measuring spring.

Load cells of the type described above are primarily used in electronic platform scales. In order to obtain a functioning scale it is merely necessary that this type of load cell is screwed to a base plate and to a scale platform carrier. In addition, such load cells are frequently used in industry in those instances where a weight representing force that is applied off-center, must be measured.

The structural size and the weight of such load cells increases with an increasing rated load and with larger scale platforms. Typical applications of the load cells relate, for example, to scales having a rated load in the range of 60 kg to 1500 kg and a platform size within the range of 0.4 m×0.4 m to 1.2 m×1.2 m. Load cells for such scales themselves have a weight of several kilograms, although they are mostly made of aluminum.

The material price of the stock of which the blank of the load cell is made thus becomes a certain factor in the production costs.

A load cell as known from German Patent Publication DE 4,313,932 A1 of the type mentioned above, comprises a measuring spring in the shape of an elongated parallelepiped which is connected at its ends by screws to a plate of the scale housing and to a scale platform carrier, respectively. The connecting areas of the measuring spring are made of the same high strength and correspondingly expensive material that is necessary for producing the measuring spring, in order to obtain a transformation of force into an expansion that is free of creep and hysteresis effects as much as possible. The material costs of the known load cell are thus relatively high.

A similar construction of the measuring spring is known from German Patent Publication DE 2,809,655 A1 disclosing a load cell in the form of a beam in which shear stresses are used for the force measurement. One embodiment of the beam exposed to shear stress comprises an I-beam.

A further load cell is known from European Patent Publication EP 0,227,850 B1 in which high strength and thus expensive alloys are used only for components serving the function of transducing of the force to be measured into material deformations and for the parallel guiding and supporting of moments. On the other hand, the longer ends of the measuring spring that are required for the securing of force introducing members and counterforce take-up members are made as frame-type connecting elements for which less demanding and thus more cost effective material may be used. The shorter measuring spring is inserted into these connecting elements. Such a construction saves high strength material for the measuring spring. However, the result is a three element structural component which requires additional effort and expense for the machining of contact surfaces and for the mounting.

It is the object of the invention to provide a load cell of the type mentioned above which is characterized by small manufacturing costs and a small expense for the material.

The above object has been achieved according to the invention in that the measuring spring is formed as a section cut by parallel cuts guided at a slant to the longitudinal axis of a rod-type blank having a constant cross-section along its length, and in that the cut surfaces at the ends of the measuring spring extend at the same angle relative to the central plane of the measuring spring, said central plane extending perpendicularly to the load direction.

The spring according to the invention, viewed from the side, has a silhouette of a parallelogram with the upper and lower contour of the blank forming one pair of parallel sides and with the contours formed by the cut surfaces providing the other pair of parallel sides. Due to this configuration of the measuring spring, the spacing of the cut surfaces is reduced in accordance with the slanting angle compared to its structural length. The required material quantity is reduced correspondingly. Thus, it is possible to cut from a blank of a given length a larger number of measuring springs according to the invention compared to the number of conventional springs shaped as a parallelepiped. Although the chip volume is larger for a slanted cut than for cuts extending perpendicularly to the longitudinal axis, however, this is negligible compared to the attainable material saving.

The advantages of a measuring spring constructed according to the invention appear most prominently when the angle between the cut planes and the central plane is in the range of 30° to 60°. For larger angles, the effect of saving materials is small. For angles smaller than 30° the cut surfaces become relatively large and the stiffness of the securing ends of the measuring spring diminishes too much. Preferably the angle between the cut surface and the central plane is about 45°. An angle of this size leads to an advantageous compromise regarding material savings, machining efforts, and in the structural configuration of the measuring spring.

According to another suggestion of the invention the measuring spring can be produced of a blank having an I-beam cross-section. Due to the reduced cross-section of such a starting material one achieves an additional savings in material compared to a rectangular solid cross-section. The I-beam cross-section has the further advantage that bores for the securing of the measuring spring by means of screws can be produced simply and with little effort and expense because these bores are to be made only in the upper or in the lower chord of the section. The measuring spring can further be made of a rod-type blank having a rectangular hollow cross-section for example a rectangular pipe or a square pipe. Depending on the type of application of the measuring spring according to the invention, it may be produced of rolled or extruded stock.

Due to the slanted extension of the cut surfaces sharp edges result at the ends of the measuring spring. According to the invention these edges can be dulled by a chamfer.

In the following the invention will be explained in more detail with reference to an example embodiment shown in the drawings, wherein.

Figure 1:
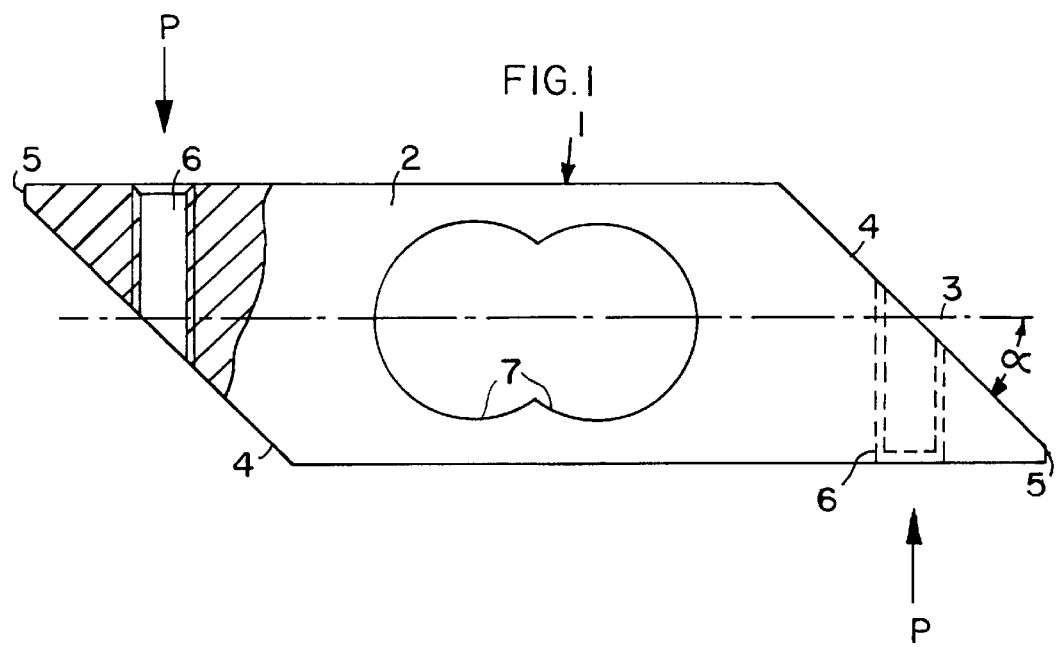
FIG. 1 is a side view of a measuring spring according to the invention produced of a rectangular solid section.
Figure 2:
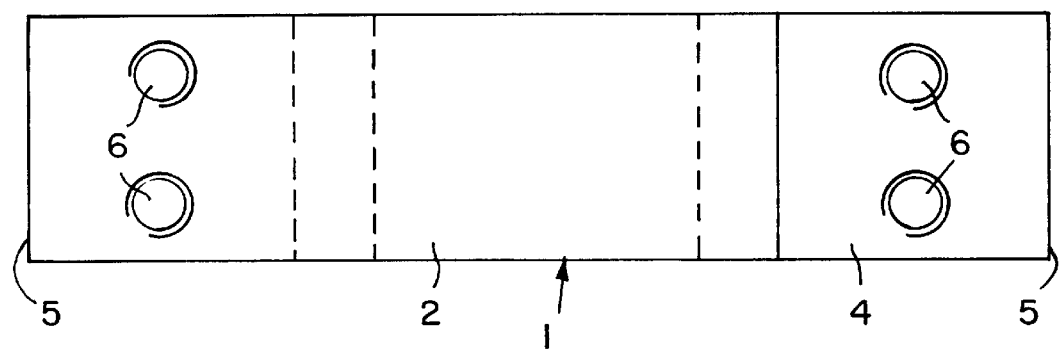
FIG. 2 is a top plan view of the measuring spring according to FIG. 1.

A measuring load cell body 1 shown in FIGS. 1 and 2 comprises a section 2 of a rod-type blank. The longitudinal axis of the blank extends in the central plane 3 which extends perpendicularly to the load introduction direction P.

The section 2 has a solid rectangular cross-section remaining constant along the length. The section 2 is cut off from a blank by cuts extending at a slant to the central plane 3. The cut surfaces 4 produced by the cutting extend parallel to one another and at an angle α of about 45° to the central plane 3. The pointed ends of the sections 3 are provided with a chamfer 5 by chip removing machining. Threaded bores 6 are provided in the pointed ends for taking up securing screws for attaching the measuring spring 1 to a base plate and to a load introduction member, for example a scale platform carrier. Two zones of reduced cross-sections are formed in the center of the measuring spring 1 by two parallel overlapping bores 7. The stress response to loads of these zones is measured by strain gages applied in these zones.

If one wishes to compare the present measuring load cell body 1 with a conventional measuring spring having a parallelepiped shape and having the same capacity, the latter would have the same rectangular cross-section and the same structural length as the measuring spring 1. However, the material saving achieved according to the invention compared to a parallelepiped measuring spring corresponds substantially to the material volume that needs to be added to the ends of the measuring spring 1 in order to complete a parallelepiped configuration. This material volume corresponds about to one half of the material needed for the securing ends.

Figure 3:
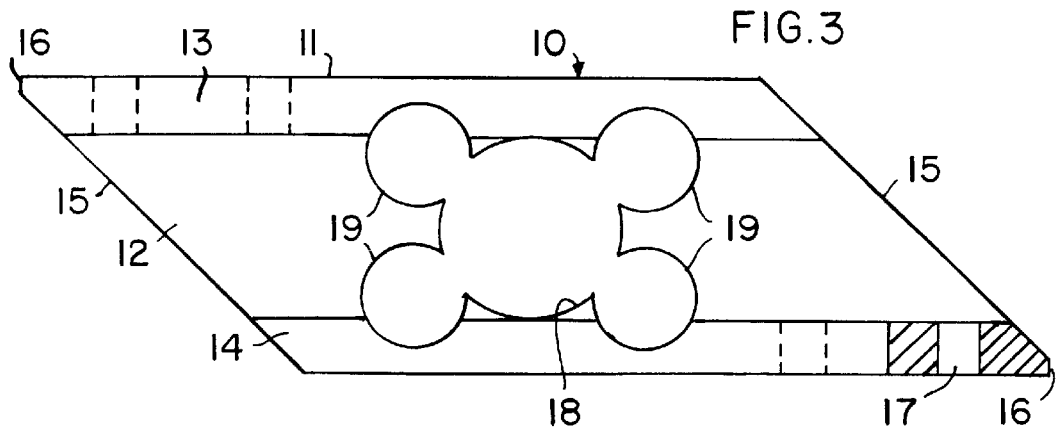
FIG. 3 is a side view of a measuring spring cut from a section having an I-beam cross-section.
Figure 4:
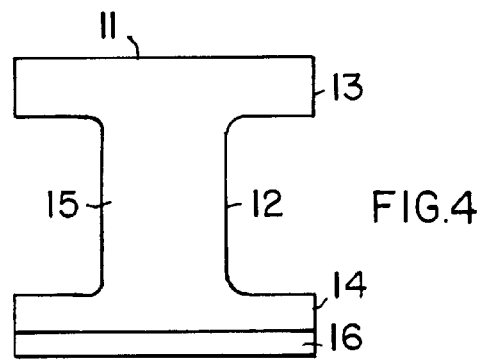
FIG. 4 is an end view of the measuring spring according to FIG. 3.
Figure 5:
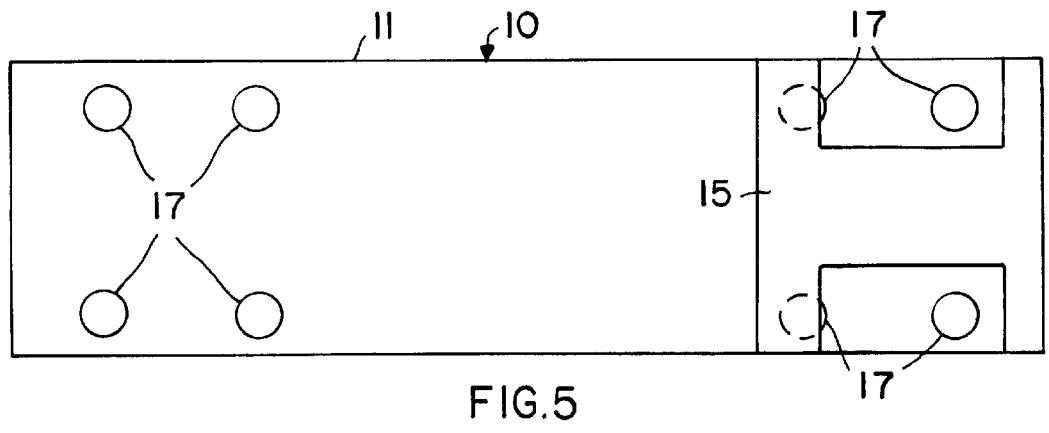
FIG. 5 is a top plan view of the measuring spring according to FIG. 3.

The measuring load cell body 10 shown in FIGS. 3 to 5 is made of a length 11 of an extruded section having an I-beam cross-section including a web 12 and flanges 13, 14 extending in parallel to each other on both sides of the web and interconnected by the web. The section 11 is severed from the extruded section by two parallel cuts, for example with the aid of a saw blade. The cuts are so guided that the cut surfaces 15 of the section 11 lie in planes that extend perpendicularly to the web 12 and are inclined for example at an angle α of 45° to the flanges 13 and 14 to form slanted load cell body ends. The sharp edges at the pointed ends of the section 11 were slightly shortened to form a chamfer 16 at each end. Due to the slanted cuts the load cell body 10 has a central load cell body portion with the I-beam cross-section between the ends but the ends themselves have a T-cross-section. Bores 17 are symmetrically arranged in the flanges 13 and 14 at the pointed ends in a symmetric arrangement. These bores serve for securing the load cell body 10 with the aid of screws to a force introducing structural component and to a load take up component respectively. In order to form two bending beams the load cell body 10 is provided in its center with a recess which is formed by one larger bore 18 and by four smaller bores 19 arranged as lobes around the bore 18. The bores 19 are positioned in a symmetric arrangement at the edge of the central bore and slightly overlap with the central bore 18. The bore 18 is positioned exclusively within the web 12. The bores 19 pass partially through the web 12 and partially through the flanges 13 and 14 respectively, thereby forming in both flanges 13 and 14 zones of smaller stiffness. The expansion response of these zones is measured by applied strain gages.

In measuring springs according to FIGS. 3 and 4, the I-beam cross-section of the starting material and the slanted arrangement of the severing cuts both contribute to the intended saving of material. It has been found to be especially advantageous that due to the free space between the flanges 13 and 14 at both sides of the web 12, the bores can be formed with a small machining effort. These bores can be produced even before the cutting of the sections 11 from the extruded section.

We claim:

1. A load cell comprising a section of sectional I-beam stock having two flanges (13, 14) and a web (12) interconnecting said flanges (13, 14) with each other, said I-beam stock having a central longitudinal axis extending in said web (12) in parallel to a length of said flanges (13, 14), said I-beam stock forming a load cell body having a first pair of elongated flange surfaces extending in parallel to each other and in parallel to said central longitudinal axis, a second pair of end surfaces extending through said web and through said flanges in parallel to each other and at a slanting angle (α) through said central longitudinal axis to form a central load cell body portion between two slanted load cell body ends, said central portion of said load cell body having an I-cross-section of said I-beam stock, each of said slanted body ends having a T-cross-section, at least one strain gage secured to said load cell body, and means for introducing a load in at least one of said slanted body ends having said T-cross-section.

2. The load cell of claim 1, wherein said slanting angle is within the range of 30° to 60° relative to said two flanges (13, 14) and relative to said central longitudinal axis.

3. The load cell of claim 2, wherein said slanting angle is about 45° relative to said two flanges (13, 14) and relative to said central longitudinal axis.

4. The load cell of claim 1, wherein at least one of said slanted body ends has a dulled tip.

5. The load cell of claim 4, wherein said dulled tip comprises a chamfer extending along a cut end of at least one of said two flanges.

6. The load cell of claim 1, wherein said means for introducing a load comprise at least one through-bore (17) in at least one of said slanted body ends.

7. The load cell of claim 6, wherein said at least one through-bore has a longitudinal axis extending perpendicularly to said central longitudinal axis of said load cell body.

8. The load cell of claim 1, wherein said two flanges comprise an upper flange (13) and a lower flange (14), said upper flange (13) having an upper flange portion projecting axially outside said lower flange (14) at one end of said load cell body (10), said lower flange (14) having a lower flange portion projecting axially outside said upper flange at an opposite end of said load cell body (10), and wherein said upper and lower projecting flange portions comprise through bores (17) therein.

\* \* \* \* \*

UNITED STATES PATENT AND TRADEMARK OFFICE
CERTIFICATE OF CORRECTION

PATENT NO. : 5,859,391
DATED : Jan. 12, 1999
INVENTOR(S) : von Hertling et al.

Page 1 of 2

It is certified that error appears in the above-identified patent and that said Letters Patent is hereby corrected as shown below:

On the Title page:
under "[45] Date of Patent:" before "Jan. 12, 1999" insert --*--;

under "[54]" after "CELL" insert
--CUT FROM STANDARD SECTIONAL STOCK AT A SLANT--;

under "[73] Assignee:" replace "Messetechnik" by --Messtechnik--;

between "GmbH, Darmstadt, Germany" and "[21] Appl. No.: 571,541" insert
--[*] Notice: This patent issued on a continued prosecution application filed under 37 CFR 1.53(d), and is subject to the twenty year patent term provisions of 35 U.S.C. 154(a)(2).--;

Col. 1, line 1, after "CELL" insert --CUT FROM STANDARD SECTIONAL STOCK AT A SLANT--;
between lines 1 and 2, insert --FIELD OF THE INVENTION--;
between lines 10 and 11, insert --BACKGROUND INFORMATION--;

UNITED STATES PATENT AND TRADEMARK OFFICE
CERTIFICATE OF CORRECTION

PATENT NO.   : 5,859,391
DATED        : Jan. 12, 1999
INVENTOR(S)  : von Hertling et al.

It is certified that error appears in the above-identified patent and that said Letters Patent is hereby corrected as shown below:

Col. 1,    between lines 61 and 62, insert --OBJECTS OF THE INVENTION--;
           between lines 64 and 65, insert --SUMMARY OF THE INVENTION--;

Col. 2,    between lines 50 and 51, insert  --BRIEF DESCRIPTION OF THE DRAWINGS--;
           between lines 63 and 64,
           insert  --DETAILED DESCRIPTION OF PREFERRED EXAMPLE EMBODIMENTS AND OF THE BEST MODE OF THE INVENTION--;

Col. 4,    between lines 9 and 10,
           insert --Although the invention has been described with reference to specific example embodiments, it will be appreciated that it is intended to cover all modifications and equivalents within the scope of the appended claims.--.

Signed and Sealed this

Seventh Day of September, 1999

Attest:

Q. TODD DICKINSON

Attesting Officer

Acting Commissioner of Patents and Trademarks